Sept. 12, 1944.  D. E. McGREEVY  2,357,836
CALIPER ATTACHMENT
Filed Nov. 23, 1942  2 Sheets-Sheet 1

Inventor
Dennis Edward McGreevy

By Clarence A. O'Brien
and Harvey B. Jacobson
Attorneys

Sept. 12, 1944.   D. E. McGREEVY   2,357,836
CALIPER ATTACHMENT
Filed Nov. 23, 1942   2 Sheets-Sheet 2

Inventor
Dennis Edward McGreevy

By Clarence A. O'Brien
and Harvey B. Jacobson
Attorneys

Patented Sept. 12, 1944

2,357,836

UNITED STATES PATENT OFFICE 2,357,836

CALIPER ATTACHMENT

Dennis Edward McGreevy, New Orleans, La.

Application November 23, 1942, Serial No. 466,616

1 Claim. (Cl. 33—148)

The present invention relates generally to new and useful improvements in calipers, and has for its primary object to provide, in a manner as hereinafter set forth, an attachment for an instrument of this character comprising novel means whereby fine measurements may be expeditiously made and accurately read.

Another very important object of the invention is to provide an attachment of the aforementioned character which is adapted to be mounted for use on different sizes of calipers.

Other objects of the invention are to provide a caliper attachment of the character described which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein.

Figure 5:
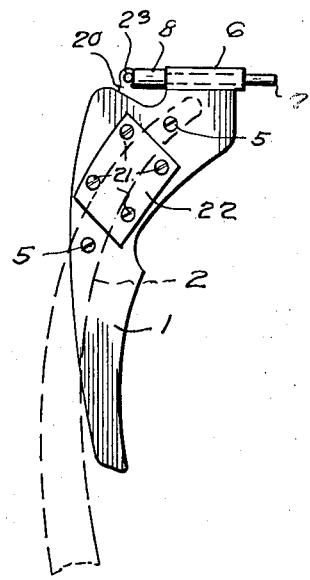
Figure 5 is a view in rear elevation of the device.
Figure 6:
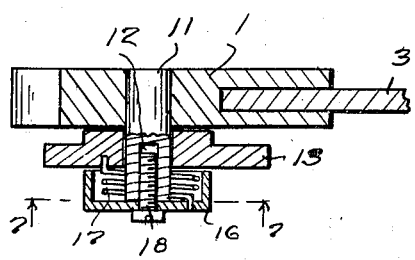
Figure 6 is a cross sectional view, taken substantially on the line 6—6 of Figure 1.
Figure 7:
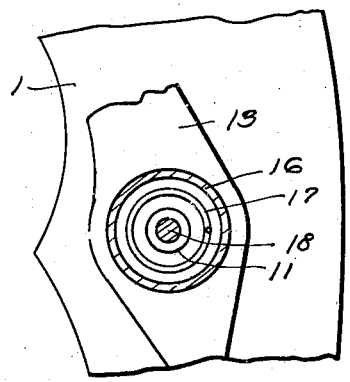
Figure 7 is a detail view in section, taken substantially on the line 7—7 of Figure 6.

Referring now to the drawings in detail, it will be seen that the embodiment of the invention which has been illustrated comprises an elongated, substantially tapered, longitudinally curved plate 1 of suitable material, said plate being of the shape shown to advantage in Figure 5 of the drawings. Extending into the plate 1 from an intermediate point in the outwardly curved outer edge thereof, to a point adjacent its forward end, is an arcuate socket 2. The socket 2 is for the reception of the free end portion of one of the legs 3 of a conventional caliper 4. Screws 5 removably secure the plate 1 in position on the caliper 4.

On its forward end, the plate 1 is formed to provide an integral, transversely extending tubular bearing 6. Slidably mounted in the bearing 6 is a work engaging contact 7. The contact 7 includes a head 8 on one end. An extension contact 9 is removably mounted on the free end portion of the other leg 10 of the caliper 4 in opposed relation to the slidable contact 7.

Projecting from the plate 1 at an intermediate point is a pin 11 having a threaded socket 12 extending thereinto from one end thereof. Journaled at an intermediate point on the pin 11 is a pointer 13. One end of the pointer 13 is cooperable with a scale 14 on the front of the plate 1 adjacent the bearing 6. Stop pins 15 on the plate 1 positively limit the swinging movement of the pointer 13 in opposite directions.

Mounted for rotary adjustment on the outer end of the pin 11 is a cap 16. A coil spring 17 has one end anchored to the cap 16 and its other end anchored to the pointer 13 for returning said pointer to zero on the scale 14. A screw 18 is threaded into the socket 12 for securing the cap 16 in adjusted position on the pin 11.

Pivotally mounted at an intermediate point, as at 19, on the forward portion of the plate 1 is a lever 20. One end of the lever 20 is engaged with the head 8 of the slidable contact 7 for actuation thereby. The other end of the lever 20 is engaged with the end portion of the pointer 13 which is remote from the scale 14 for swinging said pointer across said scale against the tension of the return spring 17.

Figures 1, 2:
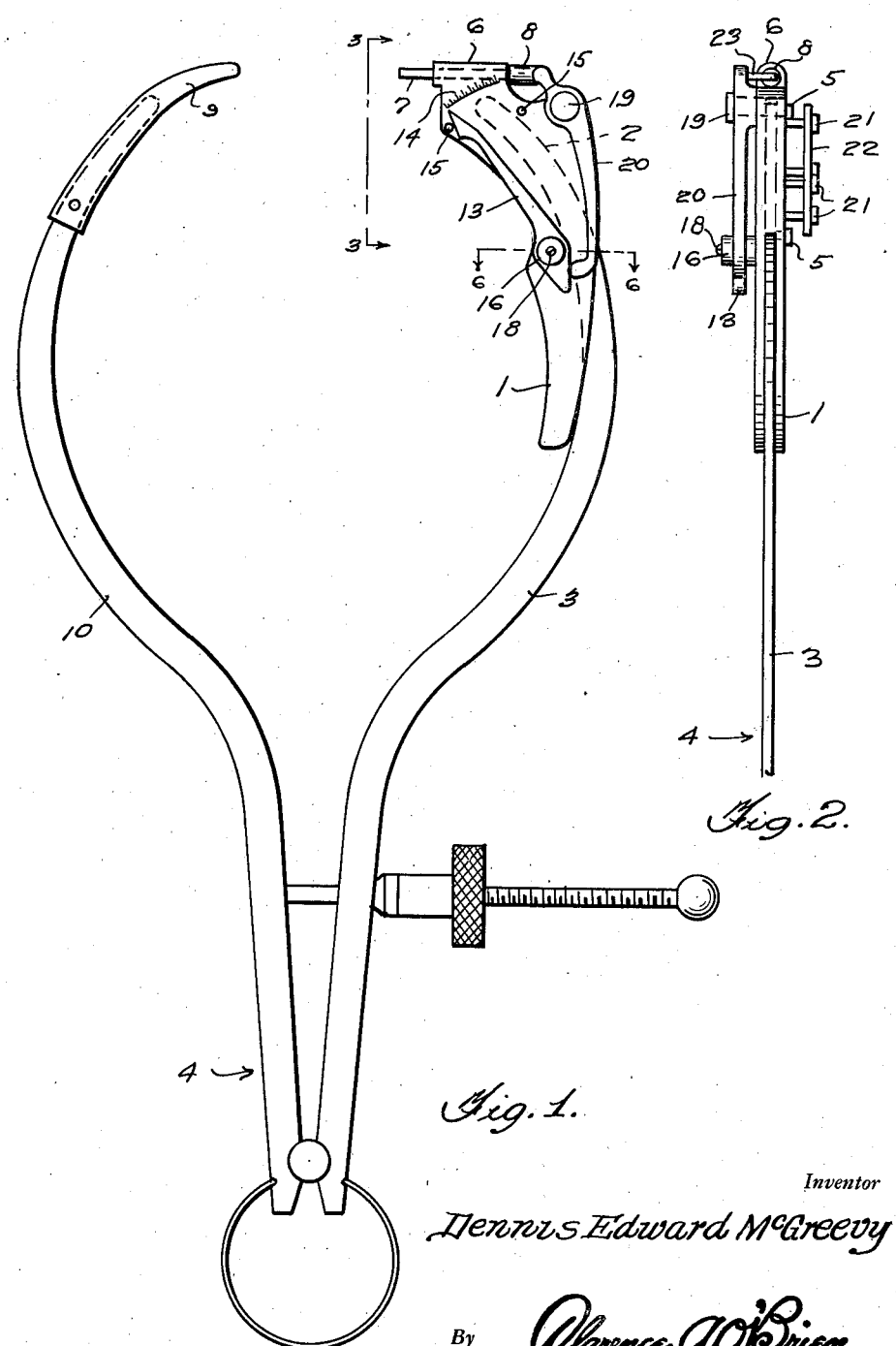
Figure 1 is a view in front elevation of an attachment constructed in accordance with the present invention mounted on a caliper.
Figure 2 is an elevational view, looking at one side of the device.
Figure 3:
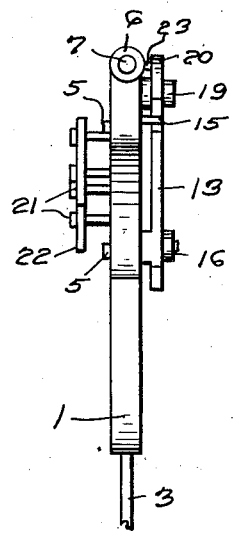
Figure 3 is an elevational view, looking at the opposite side of the device from the line 3—3 of Figure 1.
Figure 4:
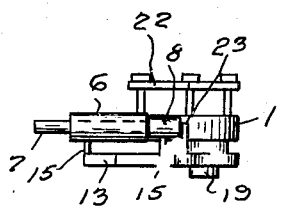
Figure 4 is a view in end elevation of the attachment.

It is thought that the operation of the attachment will be readily apparent from a consideration of the foregoing. Briefly, the pointer 13 is normally in retracted position, as seen in Figure 1 of the drawings, under the influence of the spring 17, thus yieldingly holding the slidable contact 7 in projected position through the medium of the lever 20. The caliper 4 is adjusted and the contacts 7 and 9 are engaged with the work in an obvious manner. As the instrument is moved on the work any variations in the measurement will be clearly indicated by the pointer 13. When the contact 7 is moved outwardly in the bearing 6, the lever 20 swings the pointer 13 across the scale 14 against the tension of the spring 17. Of course, when the instrument is disengaged from the work, the elements 7, 20 and 13 are returned to the position of Figure 1 of the drawings by the spring 17. By simply loosening the screw 18, the cap 16 may be rotatably adjusted to regulate the tension of the coil spring 17 as desired.

Secured by bolts 21 on the back of the plate 1 is a plate 22. The elements 21 and 22 constitute means for clamping the plate 1 on the caliper in the event that said caliper will not fit in the slot or socket 2. That is, the leg of the caliper on which the attachment is to be mounted is inserted between the plates 1 and 22, after which the bolts 21 are tightened. The head 8 of the slidable contact 7 is engaged with a pin 23 which projects from one end of the lever 20.

It is believed that the many advantages of a caliper attachment constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

A caliper attachment comprising a plate having a scale thereon, a pin projecting from the plate, a pointer journaled on the pin and cooperable with the scale, a rotatably adjustable cap mounted on the pin, a coil spring in the cap encircling the pin and having one end anchored to the cap and its other end anchored to the pointer for yieldingly resisting swinging movement of said pointer in one direction, a screw frictionally securing the cap in adjusted position on the pin, and means for actuating the pointer in said one direction against the tension of the spring.

DENNIS EDWARD McGREEVY.